United States Patent [19]

Brown

[11] 4,306,001
[45] Dec. 15, 1981

[54] ELECTRIC STORAGE CELL WITH OUTPUT POWER CONTROL

[76] Inventor: Jack M. Brown, 2362 Colgate Dr., Costa Mesa, Calif. 92626

[21] Appl. No.: 191,984

[22] Filed: Sep. 29, 1980

[51] Int. Cl.³ .......................................... H01M 10/04
[52] U.S. Cl. .................................... 429/61; 429/122; 429/67; 429/123
[58] Field of Search ........................ 429/61, 3, 67-69, 429/161, 110, 136, 121-123

[56] References Cited

U.S. PATENT DOCUMENTS

| | | | |
|---|---|---|---|
| 3,432,354 | 3/1969 | Jost | 429/68 |
| 3,536,535 | 10/1970 | Lippincott | 429/68 |
| 3,551,208 | 12/1970 | Stachurski | 429/68 X |
| 3,762,959 | 10/1973 | McCoy | 429/67 X |
| 3,846,174 | 11/1974 | Barrett | 429/161 X |

*Primary Examiner*—Anthony Skapars
*Attorney, Agent, or Firm*—Edwin A. Oser

[57] ABSTRACT

An electric storage cell which permits control of the output power without substantially increasing the power loss. An electric storage cell combining two conductive electrodes spaced from each other, and an electrolyte between the electrodes capable of generating an electric current. Means are provided for varying the conductive interfaces between the electrodes and the electrolyte. This may be effected either by varying the effective area of the electrolyte between the electrodes, for example by a movable mask disposed between the electrodes, or alternatively, the effective area of the electrodes connected to a load may be varied, for example, by a switch connecting selected electrode strips with the output circuit. The storage cell may be arranged to generate either direct or alternating current, or some other desired wave form.

9 Claims, 9 Drawing Figures

ELECTRIC STORAGE CELL WITH OUTPUT POWER CONTROL

BACKGROUND OF THE INVENTION

In the past, many attempts have been made for controlling the output power, either of the current or voltage of a storage battery. The direct current is usually controlled by including a variable resistor in the output circuit. This, of course, causes power losses, the power being converted into heat. Also, a direct current may be converted into an alternating current. If a square wave output is desired, the efficiency of the conversion can be rather high. On the other hand, if an alternating current must be in the form of a sine wave, the loss approximates 30 percent, since it is usually required to produce a square wave first, which may then be converted into a sine wave by a suitable network.

SUMMARY OF THE INVENTION

In accordance with the present invention, the output power of an electric storage cell is controlled by varying the conductive interfaces between the electrodes of the cell and the electrolyte. This may, for example, be accomplished by a mask having suitable apertures and interposed between the conductive electrodes. By moving the mask, the area of the electrolyte in the battery is controlled. It may be desirable to surround each of the electrodes with an insulating material having suitable apertures so that a small movement of the mask will vary the effective area of the electrode. In this arrangement, the output current is controlled.

Alternatively, it is also feasible to vary the effective area of the electrode which is connected to a load. To this end, each of the electrodes consists of a plurality of electrode strips insulated from each other. By means of a switch, one or more of the electrode strips of each electrode may be connected to the output current. This, of course, will vary the effective area of the battery plates in the output circuit. With this arrangement, the output current is also controlled.

By connecting two of the cells in series it is feasible to generate a sine output wave. To this end, while one of the masks prevents any current flow in one cell, the other mask should increase the output power of the other cell to generate two half-waves of sinusoidal shape.

The mask may be moved up and down, or else the mask may be rotated, with a suitable arrangement of openings in the enclosures for the electrodes.

It is also feasible to store electric power in the cell which may be delived as a direct current and to generate output power when desired and at a preferred wave form.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

The embodiments of FIGS. 1 through 7 permit the control of the effective area of the electrolyte between the electrodes. Also, these embodiments permit the control of the output current.

Figure 1:
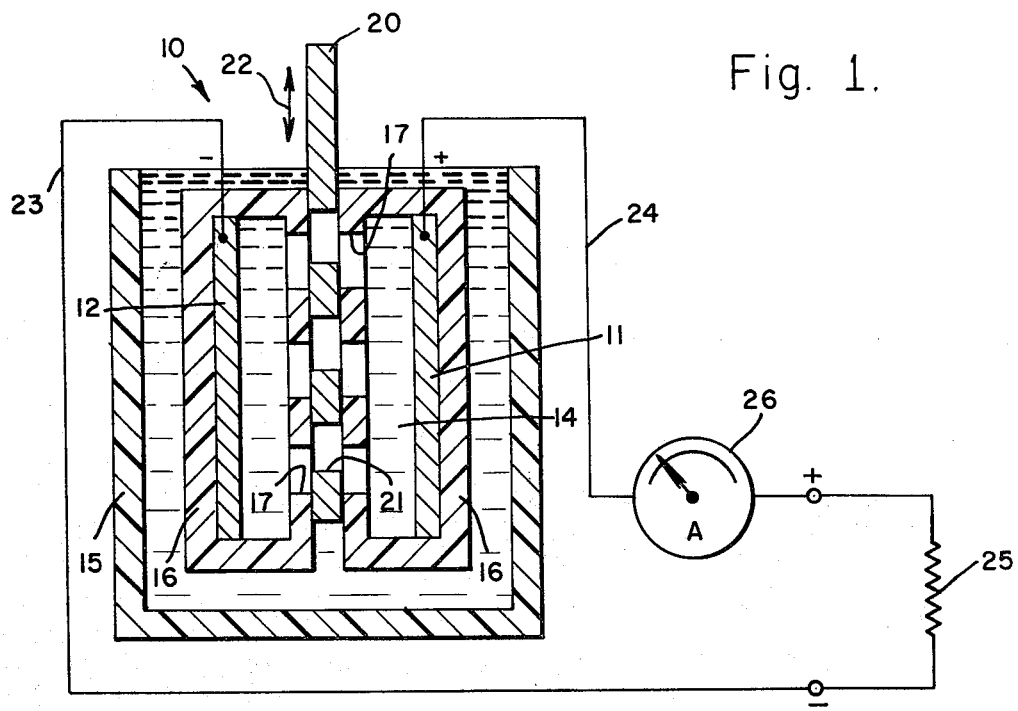
FIG. 1 is a cross-sectional view of an electric storage cell embodying the present invention, together with an output circuit.

Referring now to FIG. 1, there is illustrated a simple embodiment of electric storage cell 10 of the present invention. The storage cell 10 includes two electrodes or plates 11 and 12, one of which is a positive electrode and the other one the negative electrode. Disposed between the electrodes 11 and 12 is a suitable electrolyte 14. The electrodes 11, 12 and the electrolyte 14 may be that of a conventional lead-acid battery. The electrolyte 14 may be any conventional fluid electrolyte which operates at room temperatures or slightly elevated temperatures.

The cell 10 is disposed in a suitable case or enclosure 15 of insulating material which will withstand the action of the electrolyte 14.

In accordance with the present invention, each of the electrodes 11 and 12 is surrounded by an enclosure 16; the two enclosures may be identical to each other. Each of the enclosures 16 is provided with a series of apertures 17, through which the electrolyte 14, as well as the ions, may flow. The size of the apertures 17 is so proportioned that maximum output current may be obtained from the cell 10. This generally means that the aperture 17 may uncover about 50 percent of the electrode area.

In accordance with the present invention, there is provided a mask 20 disposed between the two enclosures 16. The mask 20 is provided with suitable openings 21, so that when the mask 20 is moved up or down, as shown by the arrow 22, the flow of the electrolyte and the ions between the two plates 11 and 12 is either partially or completely blocked.

The output circuit may include a pair of leads 23 and 24, each being connected to one of the electrodes 11, 12, and a load 25 represented by a resistor. A current or ampere meter 26 may be included in the output circuit.

It will thus be understood that by moving the mask 20 in the direction of the arrow either up or down, the output current may readily be controlled. It will also be seen that this causes substantially no power loss in the circuit. The openings 21 in the mask 20 may be so arranged that a desired output wave may be obtained, such as for example a square wave.

With a cell of the type shown in FIG. 1, the output current may be varied between 0 amperes and 0.6 amperes.

Figure 2:
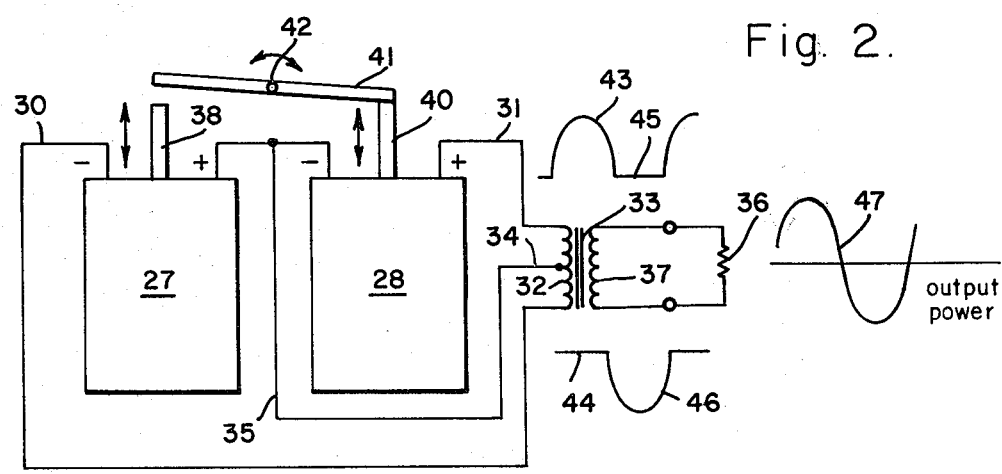
FIG. 2 is a schematic view and circuit diagram of two cells connected in series, to generate a sinusoidal output current by means of two half-waves.

Thus the embodiment of FIG. 2 provides control of the effective electrolyte area.

If it is desired to obtain a sinusoidal output wave, the storage cell arrangement of FIG. 2 will be utilized. This includes a cell 27 and a cell 28, each of which may, for example, be identical to the cell 10 of FIG. 1. The two cells are shown connected in series with the minus pole of cell 27 connected to output lead 30 and the plus terminal of cell 28 connected to output lead 31. A primary winding 32 of a transformer 33 is connected between the leads 30 and 31. A center tap 34 is connected to a lead 35 which in turn is connected between the plus terminal of cell 27 and the minus terminal of cell 28. The output load 36 may be connected to the secondary winding 37 of the transformer 33.

The two masks 38 and 40 of the two cells 27, 28 may be connected by a lever 41 having a pivot point 42 so that the two masks move in opposite directions. In other words, one mask, say mask 38, may be fully withdrawn to permit no power output from the cell 27, while the mask 40 is moved from a zero position to a maximum and back again to generate a sinusoidal half wave 43. At the same time, the output from the cell 27 is zero, as shown at 44. Subsequently, the output of cell 28 may be zero, as shown at 45, while that of cell 27 is a sinusoidal half wave 46. The combined outputs of the two cells becomes a sinusoidal wave 47 which is the output power.

Figure 4:
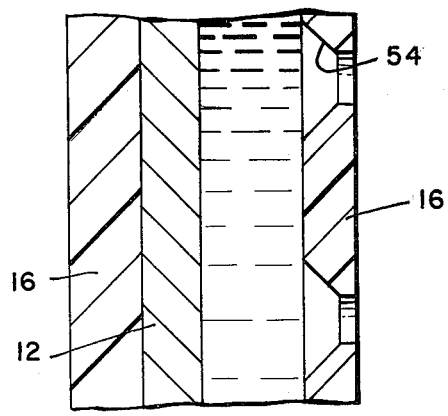
FIG. 4 is an enlarged cross sectional view of one of the electrode plates and the insulating enclosure, having tapered apertures to provide better distribution of the electrolyte.
Figure 3:
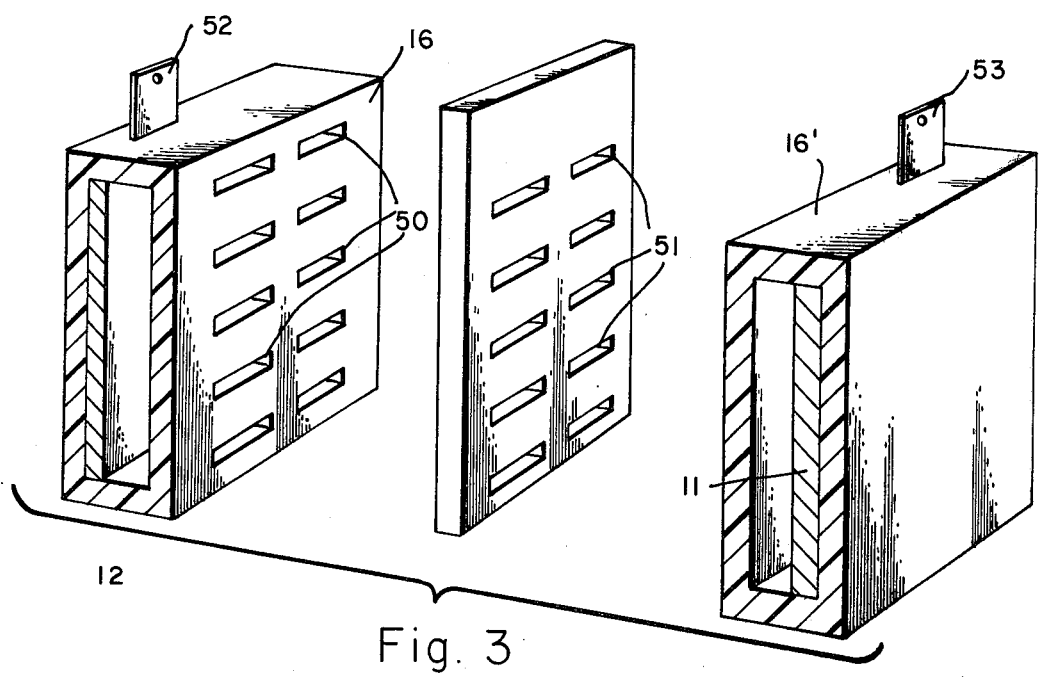
FIG. 3 is an exploded view of one electrode of the cell of the invention, the sliding mask and another electrode shown in an insulating enclosure.
Figure 5:
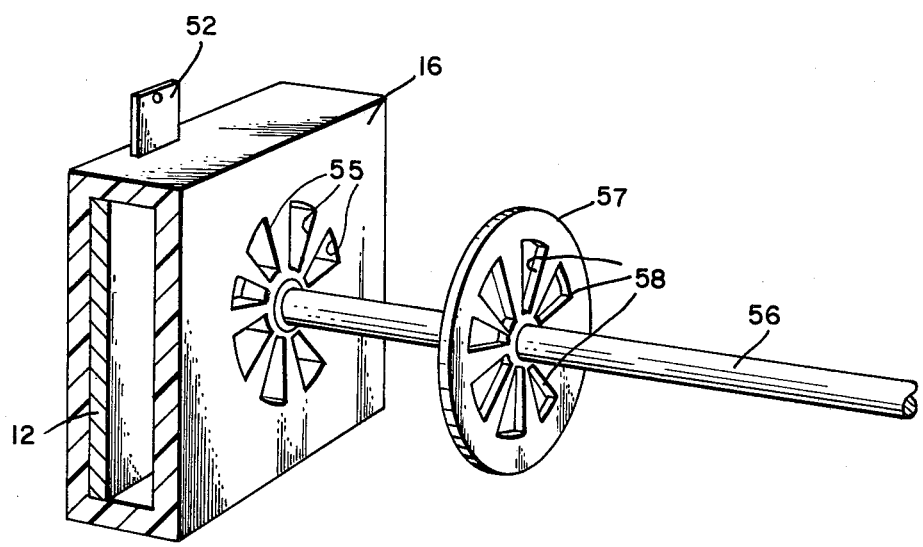
FIG. 5 is a view in perspective of another embodiment of the electric storage cell of the invention, featuring a rotatable mask.

Referring now to FIGS. 3 and 4, there is illustrated in some detail the construction of one of the enclosures 16, say, for the plate 12, as well as the construction of the mask 20. As clearly shown in FIG. 3, the enclosure 16 entirely surrounds the electrode 12. The enclosure 16 has a plurality of apertures or openings 50 which may for example be parallel and spaced from each other. Similarly the mask 20 has a plurality of openings 51 which may correspond in shape and size to the openings 50. It will be understood that the openings 50 face the other electrode 11 which has been shown in FIG. 3 surrounded by its enclosure 16'. The two plates 11 and 12 are each provided with a suitable terminal 52 and 53 to make electrical connections thereto.

FIG. 4 illustrates on a large scale a preferred embodiment for the openings 50. As shown in FIG. 4, there may be a plate 12 backed by an enclosure 16. The front part of the enclosure 16 may be provided with tapered openings 54 which have their widest opening facing the plate 12. This will provide a more even distribution for the movement of the electrolyte and the respective ions over the plate 12.

It may be noted that the case 15 may for example consist of polypropylene which may be cast, molded, or the like. The material is heat sealable so that the case may readily be sealed about the battery plates and electrolyte. The mask 20 may be made of a material known as "kapton." Alternatively, silicon-impregnated glass cloth may be used.

Instead of moving the mask 20 up and down, it is also feasible and may be preferred in certain cases to rotate the mask. This will generally provide a faster and smoother motion of the mask. Such an arrangement has been shown in FIG. 5, to which reference is now made. To this end, the enclosure 16 of one of the plates is provided with apertures 55 which extend around a central axis or shaft 56 and are wedge- or pie-shape. The mask 57 is also secured to the shaft 56 and has corresponding openings 58 which correspond to the shape of apertures 55.

It will be understood that the second electrode has basically the same arrangement.

It will be understood that when the shaft 56 is rotated the control of the effective electrolyte area can be varied at a rate determined by the number of revolutions per second of the shaft 56 and the number of openings or apertures 55, 58. Thus, by using two such units an alternating current may be obtained with a frequency in Hertz determined in the manner just outlined. The packing glands and bearings which may be required may be made of teflon. The shaft 56 may be made of glass cloth which is either impregnated with teflon or silicon formed into dowels or tubes.

Figure 6:
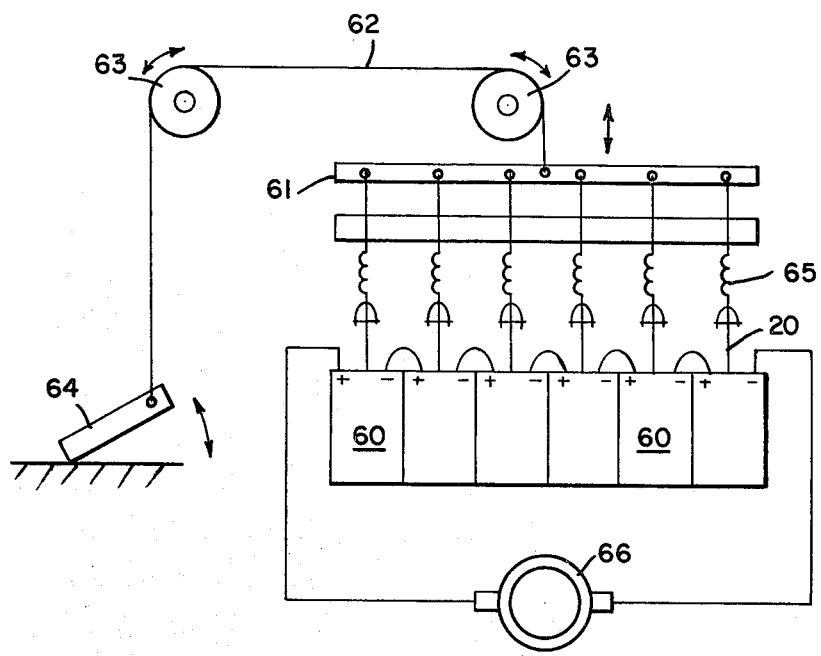
FIG. 6 illustrates schematically a plurality of cells connected in series with means for moving the masks in unison by means of a foot pedal for driving an electric motor.

It is also feasible to control a plurality of electric storage cells embodying the present invention for controlling an electric motor in an automobile. This is illustrated in FIG. 6. Here a plurality of cells 60, of which there may be any number, are connected in series. The masks 20 of the cells may be connected to a joint boom 61 which may be lifted by a cable 62, passing over pulleys 63 and may be controlled by a foot pedal 64. This will lift the respective masks 20 up, which are returned by return springs 65. The cells, in turn, may be connected to an electric motor 66.

Hence, it will be evident that the power fed to the motor 66 may readily be controlled by the foot pedal 64, thereby to control the speed of the vehicle.

It is also feasible to connect a plurality of cells in such a manner that a sinusoidal output current or voltage may be obtained. This has been shown in FIG. 7. Here a first set of cells 67 are connected in series with a second set of cells 68 of which there may be any desired number. The positive terminal of the first cell 67 is connected by a lead 70 to one terminal of a primary winding 71. Also, the negative terminal of the last cell 68 is connected by a lead 72 to the other terminal of the primary winding 71. The junction between the first set of cells 67 and the second set of cells 68 may be connected by a lead 73 to the center tap 74 of the primary winding 71. The secondary winding 75 may connect the sinusoidal power output to a load control unit 76. The cells 67 and 68 preferably are of the type shown in FIG. 5, including masks 67, which may be rotated. Hence, the shaft 56 for the cells may be driven by a synchronous motor 77 which may be energized from the power mains 78. A suitable gear box 80 may be disposed between the synchronous motor 77 and the shaft 56.

Figure 8:
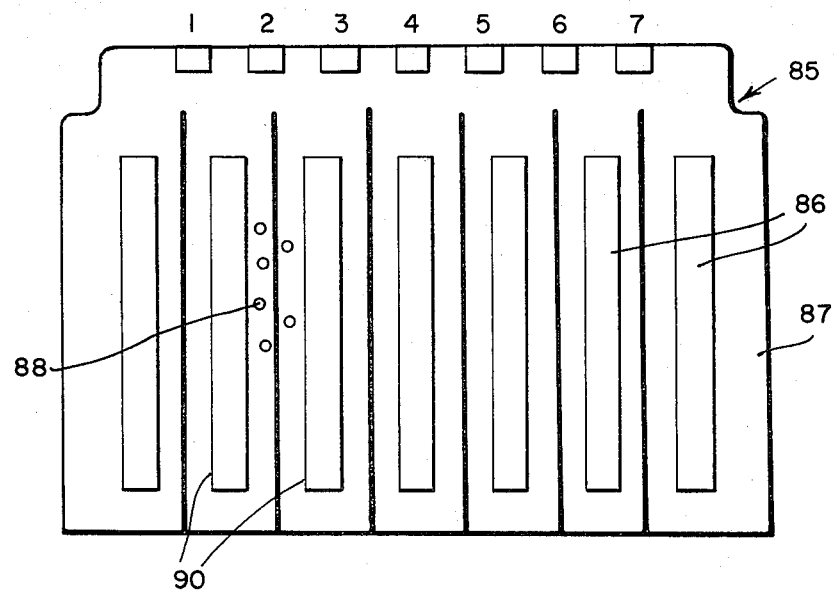
FIG. 8 is a front elevational view of another embodiment of the invention, illustrating one electrode consisting of a plurality of adjacent sections.
Figure 9:
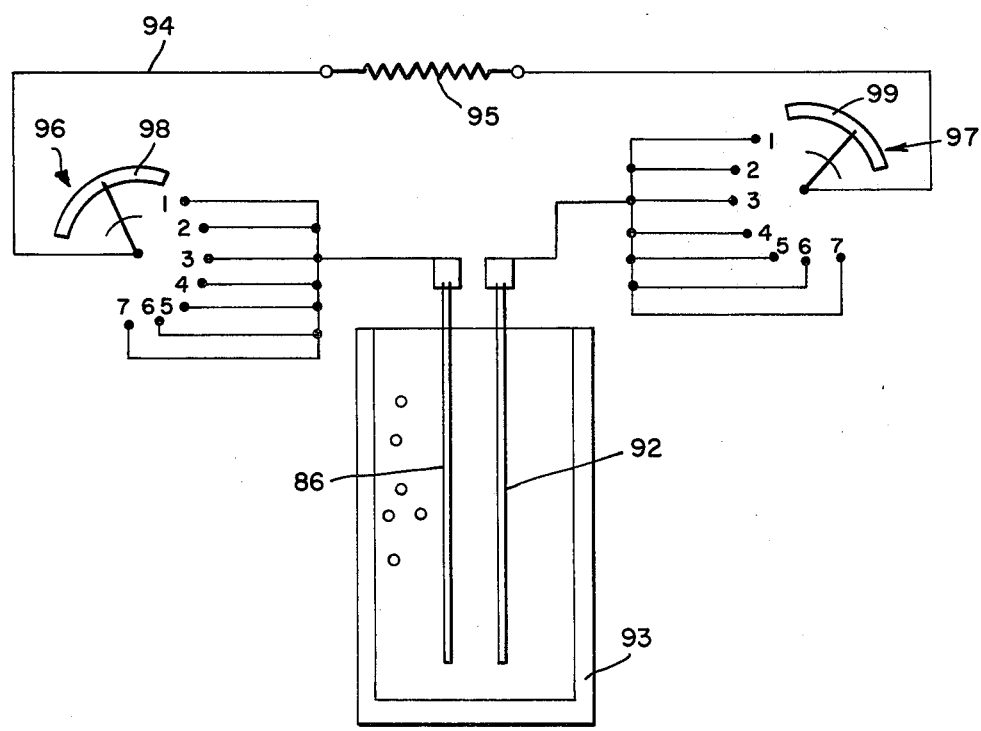
FIG. 9 is a schematic view of a storage cell in accordance with FIG. 8 and including an output load and a pair of switches for selectively switching in and out the sections of the respective electrodes.

As indicated before, it is also feasible to control the power output of a storage cell in accordance with the present invention by varying the effective area of the electrodes connected to the output circuit. Such an embodiment is shown in FIGS. 8 and 9, to which reference is now made. It should be noted that in this embodiment what is varied is the output current.

FIG. 8 illustrates an electrode 85. The electrode consists of a plurality of sections 86 which may be of rectilinear form disposed parallel to each other on an insulating material or substrate 87. The electrode sections 86 may for example be applied by techniques common in the semiconductor art.

The substrate 87 may be perforated as shown at 88 to permit the electrolyte to circulate freely. Suitable baffles 90 may be disposed between each two adjacent electrode sections 86. Hence each electrode section 86 with it corresponding section on the other electrode may be considered to be a separate electric storage cell.

FIG. 9 illustrates a cross section of the storage cell of FIG. 8 and includes an electrode section 86 and another electrode section 92 of the other electrode. The cell is again enclosed in a suitable case 93.

As shown in FIG. 8, by way of example each electrode may have seven electrode sections. The electrode sections 86 and 92 may now successively be connected in an output circuit 94 including a load 95 by two switches 96 and 97. Each of the electrode sections 86 is connected to one of the terminals of the switch labelled 1 through 7. Similarly, each of the electrode sections 92 is connected to one of the 7 terminals of the switch 97.

It will now be understood that if the switch arms 98 and 99 of the two switches 96 and 97 are rotated, successive electrode sections labelled 1, 2, 3, etc., are connected into the output circuit. The two switch arms 98 and 99 may for example be rotated by the same shaft but arranged back to back.

It will thus be obvious that the output current is controlled by a control of the effective area of the two electrodes connected to the output circuit. It will also be understood that the sections are preferably connected in unison so that two associated sections of each electrode are always connected together into the output circuit.

Figure 7:
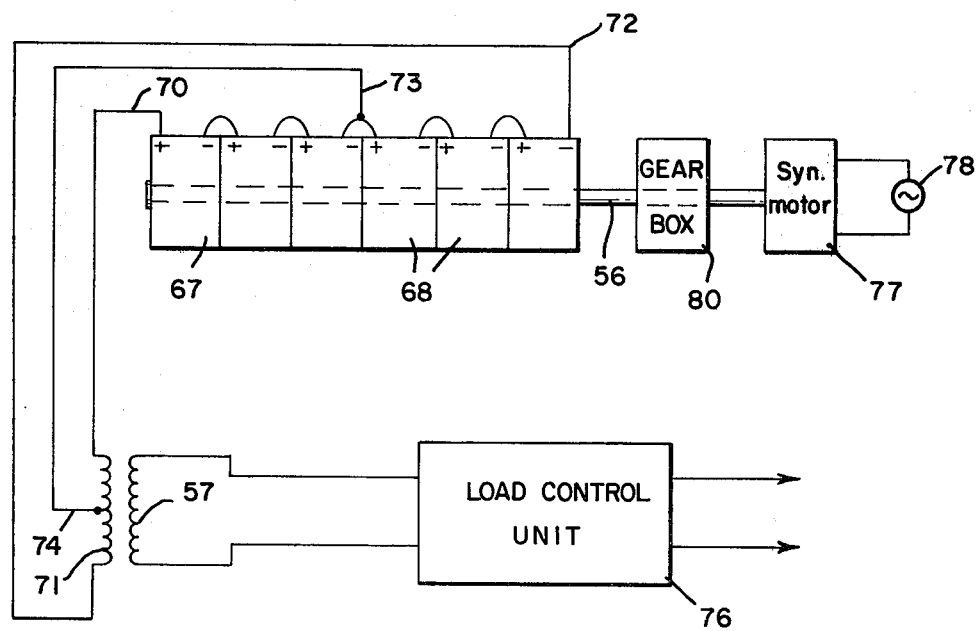
FIG. 7 is a schematic view of another arrangement of a plurality of cells connected in series for obtaining an alternating current output, the cells having a rotatable mask and a synchronous motor for driving the rotatable masks.

It will also be understood that the circuit of FIG. 7 may be used for example to both feed or store power through cells 67, 68 and for deriving output power in sinusoidal form therefrom.

There has thus been disclosed an electric storage cell, the output power of which may be controlled. This may be effected substantially without increasing the power loss. To this end either the effective area of the electrolyte between the electrodes may be varied by a mask, or, alternatively, the effective area of the electrodes connected to a load may be varied. The mask utilized for the first embodiment may either be reciprocated or rotated. In the second case a plurality of electrode sections is provided which may selectively be switched into the output circuit. By utilizing two or more cells connected in series, it is possible to derive alternating current output power. In case of a rotatable mask, the mask may be driven by a synchronous motor. The output frequency in Hertz is determined by the number of rotations per second of the mask and the number of the openings therein.

What is claimed is:
1. An electric storage cell comprising:
   (a) a pair of conductive electrodes disposed spaced from and substantially parallel to each other;
   (b) an insulating enclosure surrounding each of said electrodes, said enclosures being provided with apertures on the surfaces facing each other;
   (c) an electrolyte disposed between said electrodes capable of generating an electric current from said cell;
   (d) an apertured mask disposed between said electrodes; and
   (e) means for moving said mask between said electrodes, whereby the output power of said cell may be varied.
2. An electric storage cell comprising:
   (a) a pair of conductive electrodes disposed spaced from and substantially parallel to each other;
   (b) an insulating enclosure surrounding each of said electrodes, said enclosures being provided with apertures on the surfaces facing each other;
   (c) an electrolyte disposed between said electrodes and within said enclosures, the apertures in said enclosures being sufficiently large so that a maximum electric current is generated from said cell;
   (d) a mask disposed between said electrodes and said enclosures, said mask being provided with openings; and
   (e) means for moving said mask between said electrodes, whereby the output power of said cell may be varied without substantially increasing the power loss.
3. An electric storage cell as defined in claim 2 wherein said mask is moved in a sinusoidal manner to provide a varying current output.
4. A storage cell as defined in claim 2 wherein each of said conductive electrodes are disposed symmetrically about a central axis, the apertures of said enclosure having substantially pie shape, and wherein said mask is disc shaped and of substantially circular outline and having apertures therein corresponding to the shape of said apertures, and means for rotating said mask with respect to said electrodes and enclosures.
5. A storage cell as defined in claim 2 wherein the apertures in said insulating enclosures are tapered with the outer larger opening facing toward the associated electrode.
6. An electric storage cell comprising:
   (a) a first plurality of conductive electrodes disposed spaced from each other on a first insulating substrate;
   (b) a second plurality of conductive electrodes being equal in number to that of the first plurality and disposed spaced from each other on a second insulating substrate, the electrodes of said first and second plurality being disposed spaced from and substantially parallel to each other;
   (c) an electrolyte disposed between said first and second plurality of electrodes;
   (d) an insulating enclosure surrounding each of said plurality of electrodes, said enclosures being provided with apertures on the surfaces facing each other; a mask disposed between said electrodes, said mask being provided with openings;
   (e) a load circuit; and
   (f) switch means for connecting selected ones of said plurality of electrodes to said load circuit.
7. An electric storage means comprising:
   (a) a plurality of storage cells, each having:
      (1) a pair of conductive electrodes disposed spaced from and substantially parallel to each other; an insulating enclosure surrounding each of said electrodes and having apertures on the surfaces facing each other;
      (2) an electrolyte disposed between said electrodes capable of generating an electric current;
      (3) a mask disposed between said electrodes, said mask being provided with openings;

(b) said cells being connected in series to each other with a load circuit; and (c) means including a pedal for raising said masks with respect to said electrodes and including spring means for returning said masks to an original position.

8. An electric storage means comprising:

(a) a first and a second electric storage cell, each including a pair of conductive electrodes disposed spaced from and substantially parallel to each other; an insulating enclosure surrounding each of said electrodes and having apertures on the surfaces facing each other;

(b) an electrolyte disposed between said electrodes;

(c) a mask disposed between said electrodes and said enclosures;

(d) means for moving said mask between said electrodes; and (e) said cells being connected in series, said masks being so arranged that when one mask is fully inserted into one cell, the other mask is fully removed from the other cell, whereby an alternating current may be obtained from said cells.

9. An electric storage means comprising:

(a) a first plurality of electric storage cells;

(b) a second plurality of electric storage cells, each of said cells including (1) a pair of conductive electrodes disposed spaced from and substantially parallel to each other;

(2) an insulating enclosure surrounding each of said electrodes and having apertures on the surfaces facing each other;

(3) an electrolyte disposed between said electrodes and within said enclosures, the apertures in said enclosures being sufficiently large so that a maximum electric current is generated by said cell;

(4) a mask disposed between said electrodes, said mask being provided with openings; and (5) means for moving said mask between said electrodes, whereby the output power of said cell may be varied;

(c) said first plurality of cells being connected in series, said second plurality of cells being connected in series, and means for deriving output power from said cells from the first one of said first plurality, the last one of said second plurality and from the junction between said first and said second plurality of cells, whereby an alternating current output is obtained.

* * * * *